(12) United States Patent
Young

(10) Patent No.: US 6,801,975 B1
(45) Date of Patent: Oct. 5, 2004

(54) PARALLEL SCSI HOST ADAPTER AND METHOD FOR FAST CAPTURE OF SHADOW STATE DATA

(75) Inventor: B. Arlen Young, Palo Alto, CA (US)

(73) Assignee: Adaptec, Inc., Milpitas, CA (US)

( * ) Notice: Subject to any disclaimer, the term of this patent is extended or adjusted under 35 U.S.C. 154(b) by 506 days.

(21) Appl. No.: 10/002,887

(22) Filed: Dec. 5, 2001

(51) Int. Cl.[7] .............................................. G06F 13/14
(52) U.S. Cl. ...................... 710/305; 710/300; 710/315; 710/314; 370/389
(58) Field of Search ............................... 710/105, 300, 710/305, 315, 5, 24, 36; 370/389, 394

(56) References Cited

U.S. PATENT DOCUMENTS

| | | | | |
|---|---|---|---|---|
| 5,287,463 A | * | 2/1994 | Frame et al. ................ | 710/105 |
| 5,740,466 A | * | 4/1998 | Geldman et al. .............. | 710/5 |
| 5,797,034 A | * | 8/1998 | Young .......................... | 710/24 |
| 6,438,128 B1 | * | 8/2002 | Kashyap ...................... | 370/389 |
| 6,493,785 B1 | * | 12/2002 | Galloway .................... | 710/314 |
| 6,728,815 B1 | * | 4/2004 | Young .......................... | 710/305 |
| 6,745,260 B1 | * | 6/2004 | Young .......................... | 710/36 |

OTHER PUBLICATIONS

Kenneth Y. Yun and David I. Dill, "A High–Performance Asynchronous SCSI Controller", 1995, IEEE.*

Hitachi, "More Efficient Command and Data Transfer with Packetized SCSI", Hitachi Inc., http://www.hitachigst.com/hdd/library/whitepap/tech/hdwpacket.htm.*

Computer and Business Equipment Manufacturers Assocation, "Small Computer System Interface—3, Generic Packetized Protocol (SCSI–GPP)", 1999, American National Standards Institute, Ver. draft, pp 30–40.*

* cited by examiner

*Primary Examiner*—Xuan M. Thai
*Assistant Examiner*—Justin King
(74) *Attorney, Agent, or Firm*—Gunnison, McKay & Hodgson, L.L.P.; Forrest Gunnison

(57) ABSTRACT

A parallel SCSI host adapter includes a SCSI bus port and a host I/O bus port. The parallel SCSI host adapter takes a snapshot of state data for a first data channel coupling the SCSI bus port to the host I/O bus port following receipt of a complete Packetized SCSI protocol information unit having a context from the SCSI bus port. Following the snapshot, another Packetized SCSI protocol information unit for the same context is transferred over the first data channel. Since the snapshot requires substantially no time delay relative to a time delay associated with saving the state data in a hardware I/O command block for the context, latency between the information units for the same context is minimized in the parallel SCSI host adapter.

16 Claims, 3 Drawing Sheets

PARALLEL SCSI HOST ADAPTER AND METHOD FOR FAST CAPTURE OF SHADOW STATE DATA

BACKGROUND OF THE INVENTION

1. Field of the Invention

The present invention relates generally to parallel SCSI host adapters, and more particularly, to using a parallel SCSI host adapter with the Packetized SCSI Protocol.

2. Description of Related Art

A variety of parallel host adapter architectures is available. See for example, U.S. Pat. No. 5,655,147 or U.S. Pat. No. 5,659,690. Each parallel host adapter provides connectivity between two I/O buses, e.g., a SCSI bus to a host I/O bus such as a PCI bus.

A high-level block diagram of one prior art parallel SCSI host adapter 100 (FIG. 1) that had a channel architecture with an administrative information channel 101 and a data channel 102.

Administrative information was transferred to and from host I/O bus 170 via administrative information channel 101. Administrative information channel 101 coupled a sequencer control block (SCB) array memory 155 to PCI bus 110. Specifically, in channel 101, a command direct memory access (DMA) engine 115 coupled PCI bus 170 to SCB array memory 155. SCB array memory 155 could be either memory onboard parallel host adapter 100, or memory external to parallel host adapter 100.

Data channel 102 coupled SCSI bus 180 to PCI bus 170 so that data could be transferred between the two I/O buses. A SCSI module 120 coupled SCSI bus 180 to a first-in-first-out (FIFO) data buffer 130. SCSI module 120 transferred data on SCSI bus 180 to FIFO data buffer 130, and transferred data from FIFO data buffer 130 to SCSI bus 180.

A data DMA engine 113, typically included in a host interface module 110 within parallel host adapter 100, coupled FIFO data buffer 130 to PCI bus 170. Data DMA engine 113 transferred data on PCI bus 170 to FIFO data buffer 130, and transferred data from FIFO data buffer 130 to PCI bus 170. As is known to those of skill in the art, DMA engines 115 and 113 were typically configured by an onboard sequencer 150 using administrative information in a sequencer control block stored in SCB array 155 that was addressed by the contents of SCB array pointer register 131.

This prior art channel configuration allowed only one data context in the data channel at a time. As used here, data context means data transfers associated with a particular command, e.g., a particular SCB.

FIFO data buffer 130 was designed to minimize the time that parallel host adapter 100 required access to PCI bus 170, and to accept data from SCSI bus 180 without introducing delay on SCSI bus 180. For example, in a receive operation where data was transferred from SCSI bus 180 to PCI bus 170, data from SCSI bus 180 was collected in FIFO data buffer 130 until there was sufficient data in FIFO data buffer 130 to justify requesting access to PCI bus 170. Typically, data was burst to the host from FIFO data buffer 130 using the highest speed PCI transfer mode.

If for some reason, a transfer associated with a particular read context was stopped, the state data was transferred from DMA address/count registers 114 to the SCB in SCB array 155 by sequencer 150 when all the data was transferred from FIFO data buffer 130. This typically required a wait while the data drained from FIFO data buffer 130, which in turn affected performance.

The SPI-3 Packetized SCSI specification requires that the state of a data path be saved at the end of each data packet, referred to hereafter as a data information unit. A data information unit from target 172 may be followed by another data information unit of the same context, a data information unit of a different context, or some other SCSI bus phase not related to a data transfer.

At the end of a data information unit, host adapter 100 must save information about the data transfer that tells host adapter 100 where to resume the data transfer for another data information unit of the same context. This information was referred to above as the state of the data path.

Specifically, according to the Packetized SCSI Protocol the following must be saved:

the address of the host buffer to or from which data is to be transferred for the next data information unit of the same context, and the number of data bytes remaining to be transferred.

When the data transfer is specified by a Scatter/Gather list, information must also be saved regarding the progress through the list. Using sequencer 150 to copy the state data to the SCB between each data information unit introduces a latency that seriously degrades the performance of the data transfers using the Packetized SCSI protocol.

SUMMARY OF THE INVENTION

According to one embodiment of the present invention, a parallel SCSI host adapter includes a SCSI bus port and a host I/O bus port. The parallel SCSI host adapter takes a snapshot of state data for a first data channel coupling the SCSI bus port to the host I/O bus port following receipt of a complete Packetized SCSI protocol information unit having a context from the SCSI bus port. To take the snapshot, the state data is transferred from registers for the first data channel to corresponding registers for a second data channel. Following the snapshot, another Packetized SCSI protocol information unit for the same context is transferred over the first data channel. Since the snapshot requires substantially no time delay relative to a time delay associated with saving the state data in a hardware I/O command block for the context, latency between the information units for the same context can be eliminated in the parallel SCSI host adapter.

In one embodiment of the present invention, a parallel SCSI host adapter has a SCSI bus port and a host I/O bus port. The parallel SCSI host adapter includes a first data channel that in turn includes a first shadow register. The first data channel is selectably connected to the SCSI bus port to form a first data path between the SCSI bus port and the host I/O bus port.

The parallel SCSI host adapter, in this embodiment, further includes a second data channel that in turn includes a second shadow register coupled to the first shadow register. The second data channel is selectably connected to the SCSI bus port to form a second data path between the SCSI bus port and the host I/O bus port.

In addition, the parallel SCSI host adapter includes a first snapshot strobe line connected to the second shadow register. An active signal on the first snapshot strobe line causes content of the first shadow register to be loaded in the second shadow register. This content is one of (a) an address and (b) a count value. To capture both the address and the count value, shadow address/count registers are used.

The parallel SCSI host adapter, in one embodiment, further includes a second snapshot strobe line connected to the first shadow register. An active signal on the second snapshot strobe line causes content of the second shadow register to be loaded in the first shadow register.

The first data channel also includes a first hardware I/O command block array pointer register. Similarly, the second data channel also includes a second hardware I/O command block array pointer register connected to the first snapshot strobe line, and coupled to the first hardware I/O command block array pointer register. The active signal on the first snapshot strobe line causes content of the first hardware I/O command block array pointer register to be loaded in the second hardware I/O command block array pointer register.

The second snapshot strobe line is connected to the a first hardware I/O command block array pointer register so that the active signal on the second snapshot strobe line causes content of the second hardware I/O command block array pointer register to be loaded in the first hardware I/O command block array pointer register.

In another embodiment of this invention, a method includes transferring a Packetized SCSI protocol data information unit over a first data path of a first data channel coupling a SCSI port of a parallel SCSI host adapter to a host I/O port of the parallel SCSI host adapter. Content contained in a first shadow register of the first data channel is transferred, upon completion of receipt of the first data information unit by the SCSI port, to a second shadow register of a second data channel selectively coupling the SCSI port of the parallel SCSI host adapter to the host I/O port of the parallel SCSI host adapter. Another Packetized SCSI protocol data information unit is transferred over the first data path following the transferring content contained in the first shadow register. Content contained in a first hardware I/O command block array pointer register of the first data channel also is transferred, upon the completion of receipt of the first data information unit by the SCSI port, to a second hardware I/O command block array pointer register of the second data channel. The content of the second shadow register is transferred to a stored hardware I/O command block during the transferring another Packetized SCSI protocol data information unit.

In yet another embodiment, a parallel SCSI host adapter includes a SCSI module, a data path multiplexer and a data bus connecting the data path multiplexer to the SCSI module. A first clock line connects the data path multiplexer to the SCSI module and a first snapshot strobe line connects the data path multiplexer to the SCSI module. A first data buffer is connected to the data path multiplexer. A second clock line connects the data path multiplexer to first shadow address/count registers. A first DMA engine is connected to the first data buffer. A second data buffer is connected to the data path multiplexer. Second shadow address/count registers are connected to the first shadow address/count registers. A third clock line connects the data path multiplexer to the second shadow address/count registers. A second DMA engine is connected to the second data buffer. A second snapshot strobe line connects the data path multiplexer to the second shadow address/count registers. A third snapshot strobe line connects the data path multiplexer to the first shadow address/count registers. A first hardware I/O control block array pointer register is connected to the third snapshot strobe line. A second hardware I/O control block array pointer register is connected to the second snapshot strobe line.

BRIEF DESCRIPTION OF THE DRAWINGS

In the drawings and the following detailed description, elements with the same reference numeral are the same element. Also, the first digit of a reference numeral for an element indicates the first drawing in which that element appeared.

DETAILED DESCRIPTION

Figure 1:
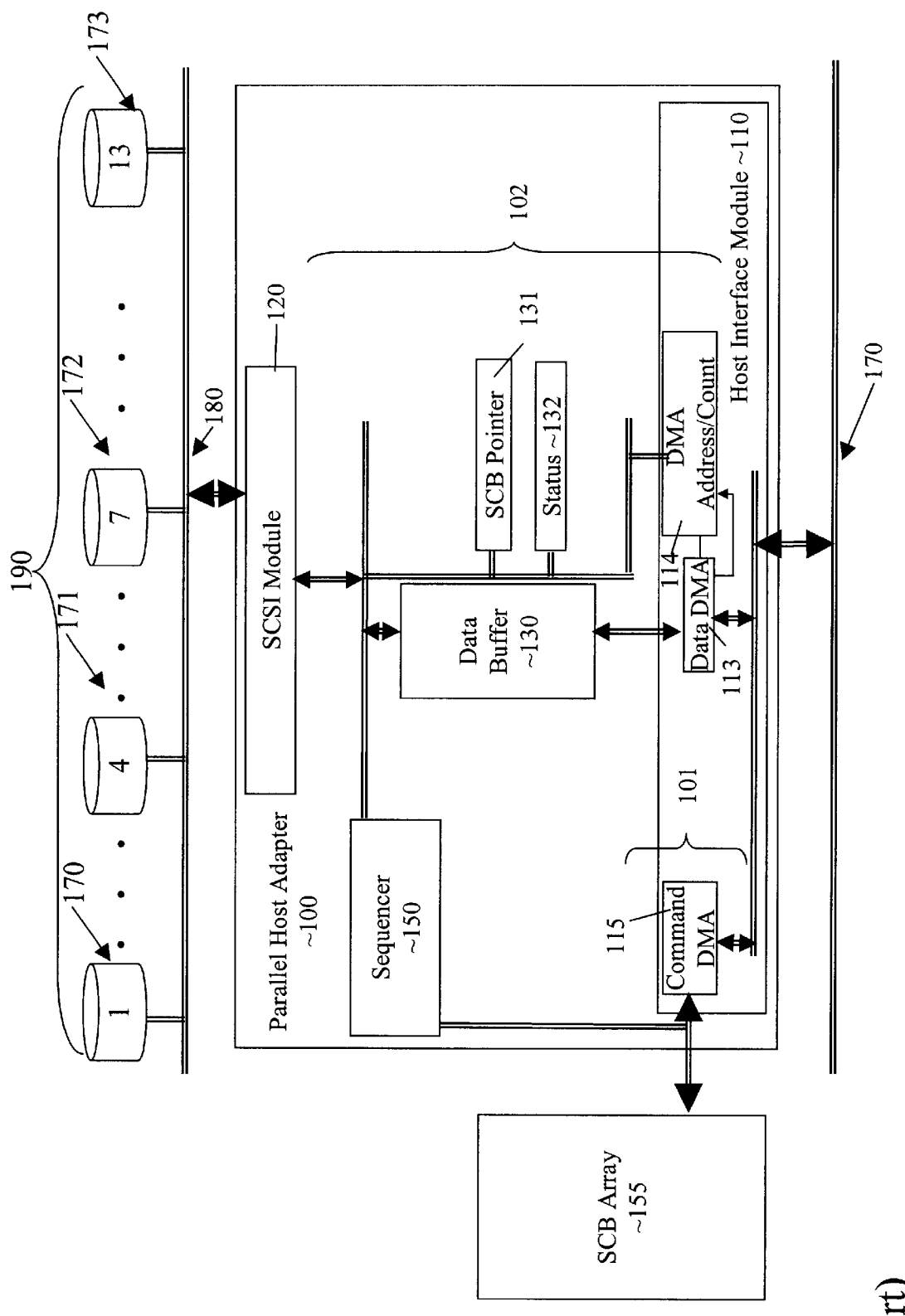
FIG. 1 is a block diagram of a prior art parallel SCSI host adapter.

According to one embodiment of the present invention, a parallel SCSI host adapter 200 eliminates the prior art bottleneck for streaming multiple information units for a single SCSI command, i.e., the same context, using the Packetized SCSI Protocol. As explained more completely below, host adapter 200 using a data path of a first data channel 201 transfers data associated with a first context between host I/O bus 170 and SCSI bus 180.

Upon completion of the transfer of a data information unit from SCSI bus 180 using the Packetized SCSI protocol for a first context, host adapter 200 determines whether the next data information unit to be transferred over SCSI bus 180 is for the first context, i.e., for the same context. If the next data information unit to be transferred is for the first context, a state of the data path of first data channel 201 is transferred from a first register associated with first data channel 201 to a second register associated with a second data channel 203 in host adapter 200. Data transfer for the first context continues using the data path of first data channel 201.

The state data in the second register are stored while the data transfer continues using the data path of first data channel 201. Hence, the state data for the data path of first data channel 201 are saved without incurring a time delay associated with switching the data path through host adapter 200, and without incurring a time delay associated with saving the state data in a SCB in SCB array 155. Consequently, the time delays associated with the prior art saving of the state data, when multiple Packetized SCSI Protocol information units for the same context are transferred in succession, have been eliminated. Hence, host adapter 200 enhances the performance for the Packetized SCSI Protocol so that saving of the required state data no longer is a limiting performance feature.

As used herein, a parallel host adapter is a host adapter that has a single data port connected to SCSI bus 180 and a single data port connected to host I/O bus 170 for both send and receive operations. While it is not illustrated in FIG. 2, those of skill in the art will understand that parallel host adapter 200 includes other circuitry and storage that are used in the operation of parallel host adapter 200. However, these components are similar to those of the prior art and so are not considered except to the extent required to implement embodiments of this invention, as described more completely below. Also, the components are not shown in the drawings to avoid distracting from the features of this invention.

Figure 2:
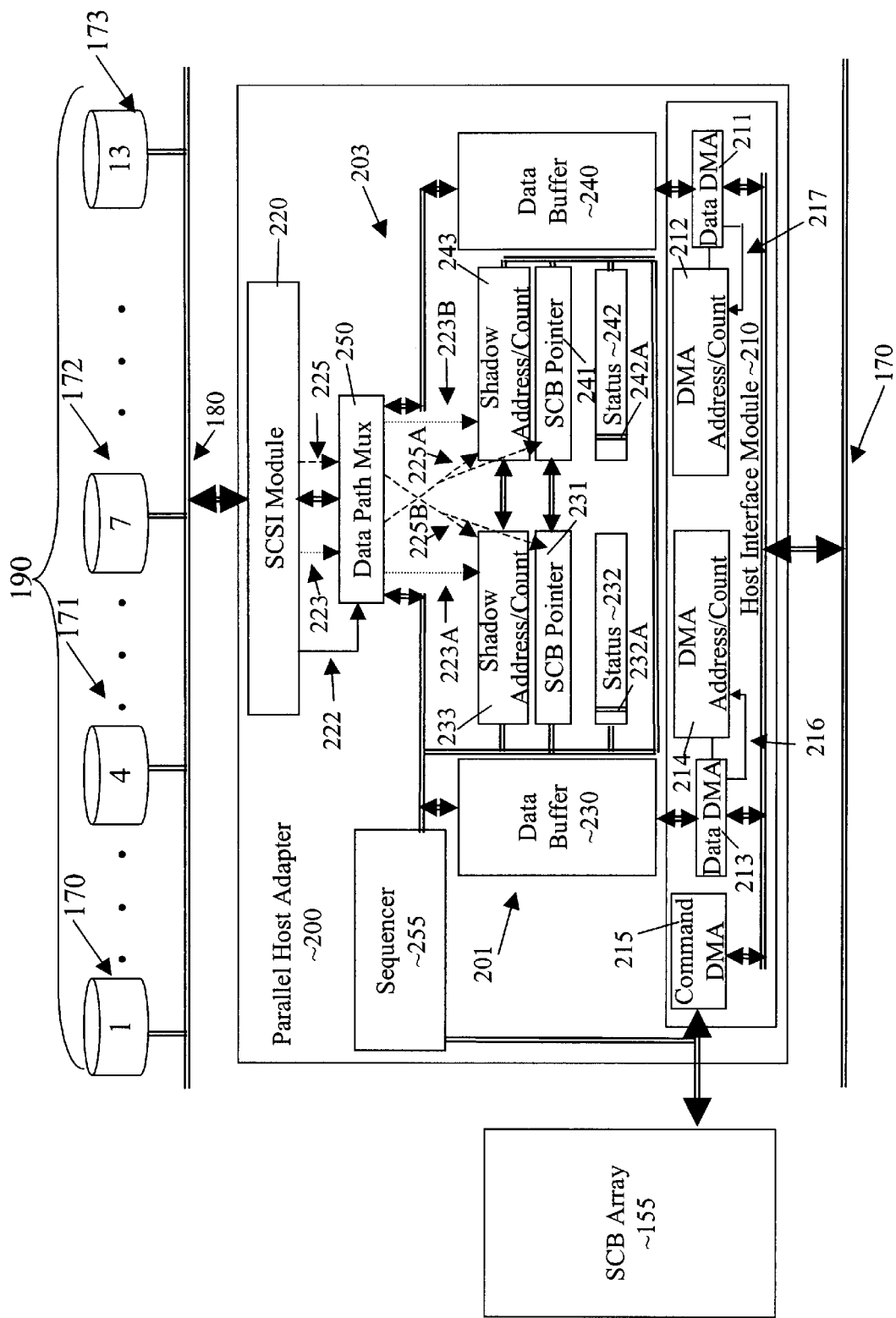
FIG. 2 is a diagram of a parallel SCSI host adapter according to one embodiment of the present invention.

In the embodiment of FIG. 2, host adapter 200 has two data channels 201 and 203. SCSI module 220, data path multiplexer 250, data buffer 230, and data DMA engine 213 define a first data path between SCSI bus 180 and host I/O bus 170 for first data channel 201. SCSI module 220, data path multiplexer 250, data buffer 240, and data DMA engine 211 define a second data path between SCSI bus 180 and host I/O bus 170 for second data channel 203.

A data path control signal on channel select line 222 from SCSI module 220 to data path multiplexer 250 determines which of the two data paths couples buses 180 and 170, or alternatively, which of data channels 201 and 203 is selectably connected to the SCSI bus port. In this embodiment, when one of data channels 201 and 203 is selectably connected to the SCSI bus port, the other data channel is said to be selectably disconnected from the SCSI bus port.

Data channel 201 includes a SCB array pointer register 231, a status register 232, and shadow address/count registers 233. Data channel 203 includes a SCB array pointer register 241, a status register 242, and shadow address/count registers 243.

In this embodiment, shadow address/count registers 233 are connected to shadow address/count registers 243. A first data channel snapshot strobe line 225A is connected to shadow address/count registers 243. When the signal on channel select line 222 selects first data channel 201, snapshot strobe line 225 from SCSI module 220 to data path multiplexer 250 is connected to first data channel snapshot strobe line 225A.

Similarly, a second data channel snapshot strobe line 225B is connected to shadow address/count registers 233. When the signal on channel select line 222 selects second data channel 203, snapshot strobe line 225 from SCSI module 220 to data path multiplexer 250 is connected to second data channel snapshot strobe line 225B. Hence, when SCSI module 220 generates an active snapshot strobe signal and that signal is applied to a first set of shadow address/count registers, the contents in the second set of shadow address/count registers are loaded in parallel into the first set of registers.

When data channel 201 is used, sequencer 255 initializes the shadow address register and the shadow count register in registers 233 with the same information as is loaded into the DMA address/count registers 214 at the beginning of a data transfer over the data path of data channel 201. In this embodiment, both shadow address/count registers 233 and DMA address/count registers 214 are counters, but with different clocks. The shadow address is incremented and the shadow byte count is decremented for each byte transferred across SCSI bus 180 by a SCSI bus clock signal on line 223A from multiplexer 250 that in turn is driven by a SCSI bus clock signal from SCSI module 220 on line 223. For registers 214, the DMA address is incremented and the DMA byte count is decremented for each byte transferred across host I/O bus 170 by a host I/O bus clock signal on line 216 from data DMA engine 213.

Similarly, when the data path of data channel 203 is used, sequencer 255 initializes the shadow address register and the shadow count register in registers 243 with the same information as is loaded into the DMA address/count registers 212 at the beginning of a data transfer over data channel 203. Again, both shadow address/count registers 243 and DMA address/count registers 212 are counters. The shadow address is incremented and the shadow byte count is decremented for each byte transferred across SCSI bus 180 by a SCSI bus clock signal on line 223B from multiplexer 250 that in turn is driven by a SCSI bus clock signal from SCSI module 220 on line 223. For registers 212, the DMA address is incremented and the DMA byte count is decremented for each byte transferred across host I/O bus 170 by a host I/O bus clock signal on line 217 from data DMA engine 211.

SCB array pointer register 231 is associated with data channel 201 and contains a pointer to the storage site in SCB array 155 containing the SCB, e.g., a hardware I/O control block, that in turn contains the SCSI command that results in data transfer over data channel 201. SCB array pointer register 241 is associated with data channel 203 and contains a pointer to the storage site in SCB array 155 containing the SCB, e.g., a hardware I/O control block, that in turn contains the SCSI command that results in data transfer over data channel 203.

This architecture is especially efficient for the Packetized SCSI Protocol, where data flow to or from a SCSI target, e.g., any one of targets 170 to 173, can change contexts with very little time delay. A context, as used herein, is the data associated with a particular SCSI command. Many SCSI commands can be active in a SCSI target at any given time.

Each SCSI command is associated with a sequencer control block that is stored in SCB array 155. A value in a SCB array pointer register, i.e., register 231 for first data channel 201 and register 241 for second data channel 203, points to a storage site in array 155 that includes the SCSI command for which data is being transferred over the selected data path between buses 180 and 170.

Data transferred from a SCSI target is temporarily stored in one of data buffers 230, 240, which are configured as first-in first-out memories (FIFOs). As soon as a prescribed amount of data has been saved in buffer 230, for example, buffer 230 is emptied to the host via host I/O bus 170, which in this embodiment is a PCI bus. Data is burst across host I/O bus 170 in groups of many bytes to take advantage of the most efficient transfer mode of host I/O bus 170.

The time for a SCSI target, e.g., target 172, to change data contexts can be short compared with time required to burst the contents of data buffer 230 across host I/O bus 170. The second data path with data buffer 240 allows data for a new context to flow, without delay, to or from target 172 while data for the old context completes flowing from the first data path to the host.

Host adapter 200 uses shadow address/count registers 233 to capture the address of the host buffer and remaining byte count for first data channel 201. The difference between the count in shadow address/counter registers 233 and DMA address/count registers 214 equals the number of bytes in data buffer 230. The next host address and remaining byte count are available in shadow registers 233 immediately at the end of receipt of a data information unit from SCSI bus 180. Hence, upon completion of transfer of a data information unit from SCSI bus 180, shadow address/count registers 233 contain the state data that must be saved according to the Packetized SCSI Protocol.

For all SCSI protocols prior to the Packetized SCSI Protocol, there is a significant time interval between the interruption of a data transfer on SCSI bus 180 and the start of another data transfer. Therefore, there is typically ample time for saving the contents of the shadow address/count registers for non-Packetized SCSI protocols. For the Packetized SCSI protocol, this time interval can be extremely short. Hence, as explained more completely below, a snapshot is taken of the contents of the shadow address/count registers 233 at the end of a data information unit so that transfer of another data information unit can start almost immediately using data channel 201.

As described above, data channels 201 and 203 are symmetric. In the following description only data channel 201 is considered. However, the same description can be applied directly to data channel 203 by substituting the corresponding component in data channel 203 for the component in data channel 201 in view of the symmetry.

When transfer of a data information unit is completed over SCSI bus 180 to data channel 201, SCSI module 220 waits to determine what the target does next. In one embodiment, data information unit check operation 301 in SCSI module 220 transfers processing to phase change check operation 302 upon completion of transfer of a data information unit from SCSI bus 180.

If the target switches SCSI bus 180 to a phase other than phase Data In or phase Data Out, phase change check operation 302 transfers to set bit operation 306 and otherwise to context change check operation 303. In set bit operation 306, SCSI module 220 disconnects data channel 201 from SCSI bus 180 and asserts a save data pointers bit 232A in a status register 232 for data channel 201. SCSI module 220 then continues to process the SCSI bus phase change.

In store state operation 307, sequencer 255 eventually recognizes that save data pointers bit 232A is asserted for channel 201. Sequencer 255 saves the contents of shadow address/count registers 233 by moving the contents to the SCB pointed to by the pointer in SCB array pointer register 231 for data channel 201. Sequencer 255 has a reasonable amount of time to save the contents of registers 233, because the target is not currently transferring data.

If the target starts a data information unit for a different context, context change check operation 303 transfers to set bit operation 308 and otherwise to channel available check operation 304. In set bit operation 308, SCSI module 220 disconnects data channel 201 from SCSI bus 180 and asserts save data pointers bit 232A in status register 232 for data channel 201.

Again, in store state operation 307, sequencer 255 eventually recognizes that save data pointers bit 232A is asserted for channel 201. Sequencer 255 saves the contents of shadow address/count registers 233 by moving the contents to the SCB pointed to by the pointer in SCB array pointer register 231 for data channel 201. Sequencer 255 has a reasonable amount of time to save the contents of registers 233, because after set bit operation 308, SCSI module 220 transferred to channel available check operation 309.

If the target is transmitting data for a different context, channel available check operation 309 transfers to switch channel operation 310 if data channel 203 is available, and otherwise to hold-off target operation 311. Hold-off target operation 311 holds off the target from sending the new context data until data channel 203 is available and then returns to check operation 309 that in turn transfers to switch channel operation 310. In switch channel operation 310, the data for a different context is routed by SCSI module 220 to data channel 203. Thus, second data channel 203 is being used and so sequencer 255 does not have to save the contents in registers 233 in store state operation 307 prior to starting the transmission of data for another context via data channel 203.

If at the end of the transfer of a data information unit from SCSI bus 180, the target begins the transfer of another data information unit in the same context, SCSI module 220 keeps SCSI bus 180 connected to data channel 201, and processing reaches channel available check operation 304. If the other data channel, e.g., data channel 203 is not in use, channel available check operation 304 transfers to transfer state operation 312 and otherwise to hold-off target operation 305. Hold-off target operation 305 holds off the target from sending the next data information unit until data channel 203 is available and then returns to check operation 304 that in turn transfers to transfer state operation 312. Typically, the other data channel is available and so operation 305 is included only to prevent any possible contention for the other channel.

In transfer state operation 312, before clocking shadow address/count registers 233 for the next data information unit for the same context, SCSI module 220 generates an active snapshot strobe signal on line 225 to data path multiplexer 250. Data path multiplexer 250 routes the active snapshot strobe signal on line 225 to the shadow address/count registers for the data channel that is not selected by data path multiplexer 250. In this example, data channel 201 is being used and so data path multiplexer 250 routes the active snapshot strobe signal on line 225 to line 225A to shadow address/count registers 243.

Hence, in this example, the contents of shadow address/count registers 233, i.e., all bits, are loaded in parallel into shadow address/count registers 243 upon registers 243 receiving the active snapshot strobe signal on line 225A. Since all bits are transferred simultaneously in parallel, this transfer is very much faster than a transfer by sequencer 255 to the SCB in SCB array 155. Hence, transfer state operation 312 takes a snapshot of the state data in the shadow address/count registers without requiring any additional on-chip storage area. Transfer state operation 312 transfers to transfer pointer operation 313.

Also, in this embodiment, SCB array pointer register 231 is connected to SCB array pointer register 241 so that in response to an active snapshot strobe signal to one of the SCB array pointer registers, the contents in the other SCB array pointer register are loaded in parallel into that SCB array pointer register. Hence, in this example, the contents of SCB array pointer register 231, i.e., all bits, are loaded in parallel into SCB array pointer register 241 upon register 241 receiving the active signal on line 225A. Since all bits are transferred simultaneously in parallel, this transfer is very fast.

Figure 3:
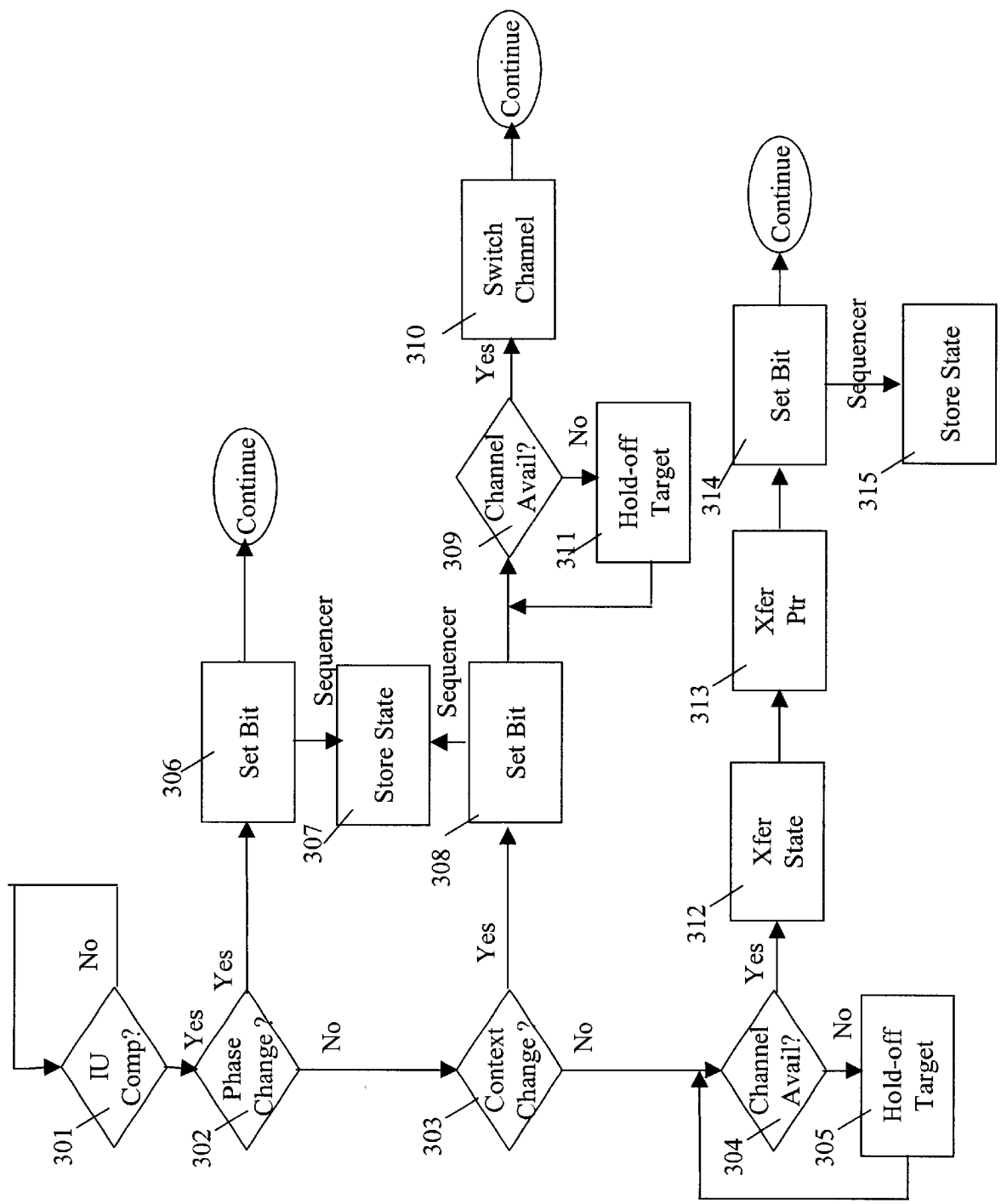
FIG. 3 is a process flow diagram for one method of using of the parallel SCSI host adapter of FIG. 2.

The sequence of operations in FIG. 3 are illustrative only, and are not intended to limit the invention to this specific sequence. For example, while operations 312 and 313 are shown as sequential in FIG. 3, in practice operations 312 and 313 occur simultaneously. Similarly, SCSI module 220 does not cycle through the three check operations 301 to 303. Rather, when an action is taken on SCSI bus 180, SCSI module 220 determines what action was taken and performs the appropriate sequence of operations.

Returning to FIG. 3, transfer pointer operation 313 transfers to set bit operation 314. In set bit operation 314, SCSI module 220 asserts save data pointers status bit 242A in status register 242 for data channel 203, but not in status register 232 for data channel 201, which is the currently active data path in host adapter 200.

After issuing the active snapshot strobe signal, SCSI module 220 continues the data transfer through data channel 201, as if there had been no interruption by data information unit boundaries. Hence, data for the context continues flowing through data channel 201 across the data information unit boundaries, without delay and without having to reconfigure the data path in host adapter 200 for the next information unit.

In store state operation 315, sequencer 255 eventually recognizes that save data pointers bit 242A is asserted. Sequencer 255 saves the contents of shadow address/count registers 241 by moving the contents to the SCB pointed to by the pointer in SCB array pointer register 241. In this case, the contents of registers 243 are the state data at the end of the previous data information unit for data channel 201. Sequencer 255 has a reasonable amount of time to save the contents of registers 243, because the target is transferring data for the same context over data channel 201.

As described above, there is complete symmetry between data paths 201 and 203. Therefore, the description of operation presented above is identical when data paths 201 and 203 are exchanged. If a data context is continued in data channel 203 across data information unit boundaries, data channel 201 will contain the snapshot of the contents of shadow address/counter registers 243 from data channel 203 at the end of transfer of the previous data information unit from SCSI bus 180.

The hardware circuit embodiments are illustrative only, and are not intended to limit the invention to the particular configuration illustrated. In view of this disclosure, those of skill in the art can implement the saving of data path states using any desired combination of shadow registers.

I claim:

1. A parallel SCSI host adapter having a SCSI bus port and a host I/O bus port, said parallel SCSI host adapter comprising:
   a first data channel comprising a first shadow register,
      wherein said first data channel is selectably connected to said SCSI bus port to form a first data path between said SCSI bus port and said host I/O bus port;
   a second data channel comprising a second shadow register coupled to said first shadow register,
      wherein said second data channel is selectably connected to said SCSI bus port to form a second data path between said SCSI bus port and said host I/O bus port; and
   a first snapshot strobe line connected to said second shadow register,
      wherein an active signal on said first snapshot strobe line causes content of said first shadow register to be loaded in said second shadow register.

2. A parallel SCSI host adapter as in claim 1 wherein said content is an address.

3. A parallel SCSI host adapter as in claim 1 wherein said content is a count value.

4. A parallel SCSI host adapter as in claim 1 further comprising:
   a second snapshot strobe line connected to said first shadow register,
      wherein an active signal on said second snapshot strobe line causes content of said second shadow register to be loaded in said first shadow register.

5. A parallel SCSI host adapter as in claim 4 wherein said first data channel further comprises:
   a first hardware I/O command block pointer register connected to said second snapshot strobe line.

6. A parallel SCSI host adapter as in claim 1 wherein said first data channel further comprises:
   a first hardware I/O command block array pointer register.

7. A parallel SCSI host adapter as in claim 6 wherein said second data channel further comprises:
   a second hardware I/O command block array pointer register connected to said first snapshot strobe line, and coupled to said first hardware I/O command block array pointer register
      wherein said active signal on said first snapshot strobe line causes content of said first hardware I/O command block array pointer register to be loaded in said second hardware I/O command block array pointer register.

8. A parallel SCSI host adapter as in claim 7 further comprising:
   a second snapshot strobe line connected to said first shadow register,
      wherein an active signal on said second snapshot strobe line causes content of said second shadow register to be loaded in said first shadow register.

9. The parallel SCSI host adapter as in claim 8 wherein said second snapshot strobe line is connected to said a first hardware I/O command block array pointer register, and further wherein said active signal on said second snapshot strobe line causes content of said second hardware I/O command block array pointer register to be loaded in said first hardware I/O command block array pointer register.

10. A method comprising:
    transferring a first Packetized SCSI protocol data information unit over a first data path of a first data channel coupling a SCSI port of a parallel SCSI host adapter to a host I/O port of said parallel SCSI host adapter;
    transferring content contained in a first shadow register of said first data channel, upon completion of receipt of said first Packetized SCSI protocol data information unit by said SCSI port, to a second shadow register of a second data channel selectively coupling said SCSI port of said parallel SCSI host adapter to said host I/O port of said parallel SCSI host adapter; and
    transferring another Packetized SCSI protocol data information unit over said first data path following said transferring content contained in said first shadow register.

11. The method of claim 10 further comprising:
    transferring content contained in a first hardware I/O command block array pointer register of said first data channel, upon said completion of receipt of said first Packetized SCSI protocol data information unit by said SCSI port, to a second hardware I/O command block array pointer register of said second data channel.

12. The method of claim 10 further comprising:
    transferring said content of said second shadow register to a stored hardware I/O command block during said transferring another Packetized SCSI protocol data information unit.

13. A parallel SCSI host adapter comprising:
    a SCSI module;
    a data path multiplexer;
    a data bus connecting said data path multiplexer to said SCSI module;
    a first clock line connecting said data path multiplexer to said SCSI module;
    a first snapshot strobe line connecting said data path multiplexer to said SCSI module;
    a first data buffer connected to said data path multiplexer;
    first shadow address/count registers;
    a second clock line connecting said data path multiplexer to said first shadow address/count registers;
    a first DMA engine connected to said first data buffer;
    a second data buffer connected to said data path multiplexer;
    second shadow address/count registers connected to said first shadow address/count registers;
    a third clock line connecting said data path multiplexer to said second shadow address/count registers;
    a second DMA engine connected to said second data buffer;

a second snapshot strobe line connecting said data path multiplexer to said second shadow address/count registers; and a third snapshot strobe line connecting said data path multiplexer to said first shadow address/count registers.

14. The parallel SCSI host adapter of claim 13 further comprising:

a first hardware I/O control block array pointer register connected to said third snapshot strobe line.

15. The parallel SCSI host adapter of claim 14 further comprising:

a second hardware I/O control block array pointer register connected to said second snapshot strobe line.

16. The parallel SCSI host adapter of claim 13 further comprising:

a hardware I/O control block array pointer register connected to said second snapshot strobe line.

* * * * *